May 25, 1954

F. RAUPACH 2,679,558

STEPPING CONTACT ARRANGEMENT

Filed Dec. 11, 1951

INVENTOR
FRIEDRICH RAUPACH
BY

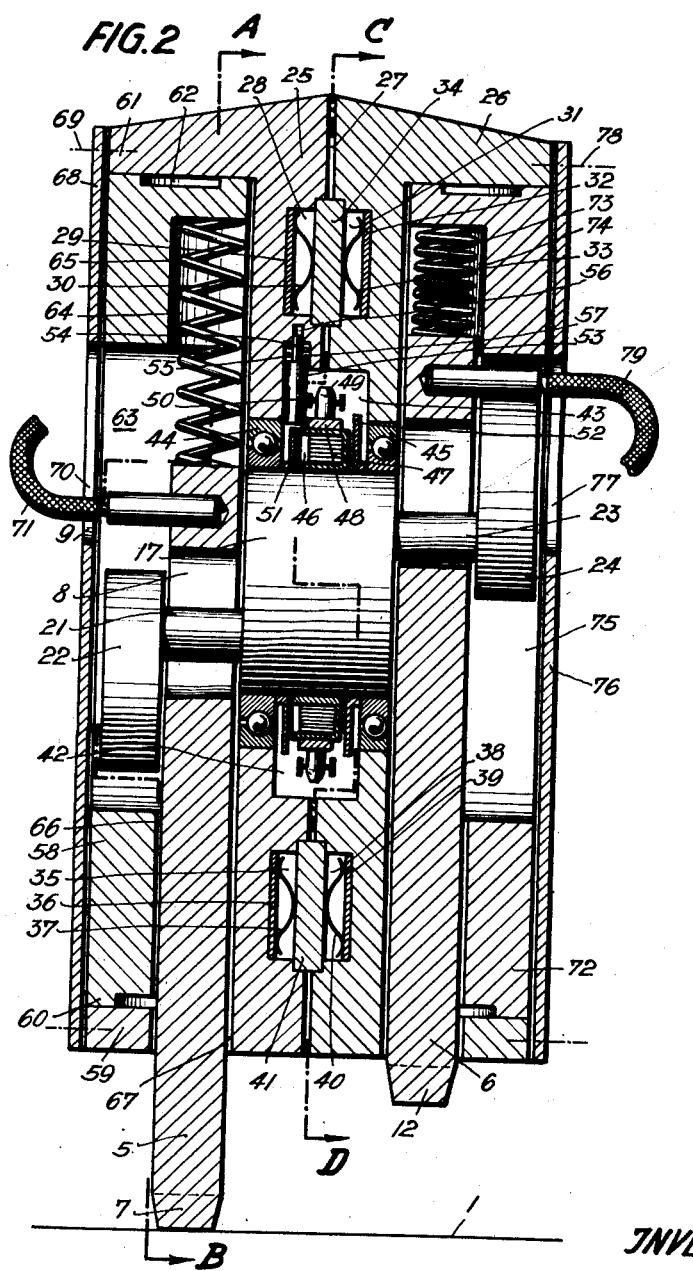

May 25, 1954　　　F. RAUPACH　　　2,679,558
STEPPING CONTACT ARRANGEMENT
Filed Dec. 11, 1951　　　　　　　　　　　　　4 Sheets-Sheet 3
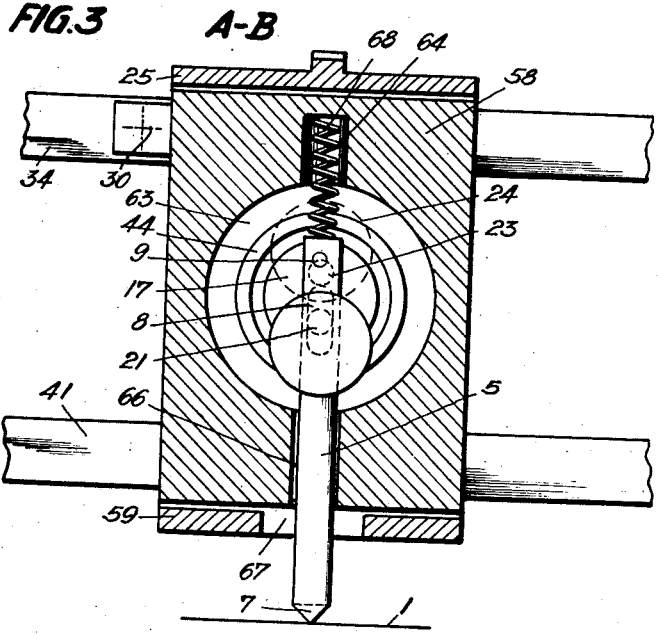
FIG.3　A-B
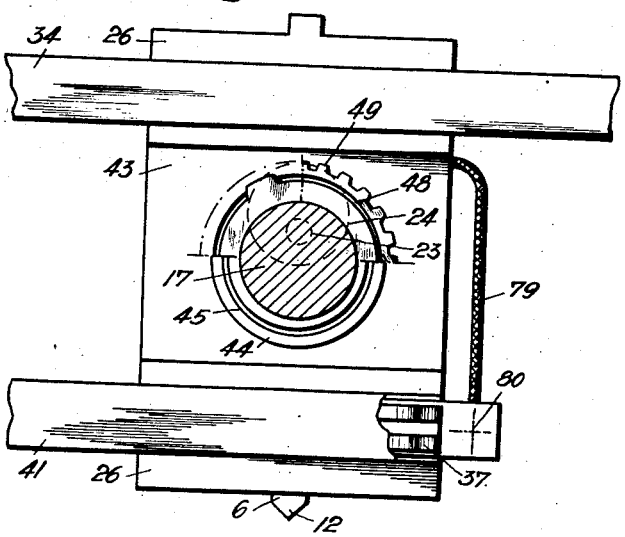
FIG.4　C-D
INVENTOR
FRIEDRICH RAUPACH Patented May 25, 1954

2,679,558

UNITED STATES PATENT OFFICE 2,679,558

STEPPING CONTACT ARRANGEMENT

Friedrich Raupach, Bamberg, Germany

Application December 11, 1951, Serial No. 260,984

8 Claims. (Cl. 200—17)

The present invention relates to a process and appropriate device for carrying out the stepped regulation, particularly fine regulation of medium-sized electrical outputs by tapping individual contact points located in series.

For regulating transformers, it is known for example to have the bare turns of the regulating winding tapped by means of a switching member. For this purpose, the regulating winding surrounding the iron core is, for example, rotatably wound, whilst an axially displaceable current collector slides along the turns. It is also known, to dispose the regulating winding fixedly and to guide the current collector, which slides on the turns, around the winding, tracing a helical path.

Both processes and their devices for carrying them out, are, however, not satisfactory. Rotatable regulating windings require special and very accurate mountings, which have to be dimensioned individually for each transformer capable of regulation; also, the winding has to be bare for the whole length. Still more disadvantageous is the process of guiding the current collector, which slides on the regulating winding, on a helical path about said winding; such current collectors have a complicated construction and necessitate considerable expenditure of materials and auxiliary devices, such as mountings and the like.

The advantages of stageless regulation, which the known processes possess, are outweighed by the inconveniences mentioned. Efforts were therefore made in other directions, and experiments were made using a metal roller as the current collector, this metal roller was made to run on a regulating winding consisting of two conductors which were wound in the same direction side by side and were preferably connected with each other by way of a choke coil or a resistance. This proposal brought somewhat nearer the solution of the problem of uninterruptedly supplying or deriving fairly heavy currents whilst avoiding complicated rotatable tapping methods. However, the higher expenditure of material and winding space caused by the doubling of the winding proves so disadvantageous that this process is also not satisfactory.

It was therefore proposed to employ a carbon roller as the current collector instead of the metal roller. The capacity of such regulating transformers is very limited however, because the potential differences of the windings amount to hardly more than one volt and the carbon roller may only carry a maximum load of about 40 amperes. In view of the useful length of the iron core and thus of the length of the winding and the number of turns, this loading normally corresponds to a three-phase output of roughly 100 kva. For the regulation of larger outputs, the booster and rotary transformers, are, indeed, available; they regulate without stages. However, their use is only economically justified with considerably higher outputs, because such transformers are very expensive on account of the large amount of material required and their mechanical construction.

The problem still remained of producing a cheap and simple process and corresponding device for carrying out the regulation, in as fine stages as possible, of fairly large or medium electrical outputs, especially for regulating transformers, resistance, etc. The upper limit here is constituted roughly by the smallest output at which booster and step transformers are still economic.

According to the invention a process for the stepped regulation, particularly fine regulation, of fairly large electrical outputs by tapping, particularly in connection with regulating transformers, regulating resistances and the like, in which individually spaced contact points are switched in and out again by means of switching members, is characterised by the feature that for the execution of switching steps at least two contact or switching members disposed and actuated in a supporting means guided along a row of contacts, are used alternately, but without interruption of the supply or discharge of current, in such a manner that, while one contact member is touching one contact point, the other contact member, advancing and omitting the contact point being touched by the first contact member, moves onward and is placed upon the following contact point, whereupon, directly thereafter, the first contact member is lifted very rapidly, preferably in a jerky manner, from its contact point and, skipping the contact point being touched by the second member, is placed upon the next contact point.

The process according to the invention has in particular the advantage that it affords a very reliable, readily adjustable and easily inspected supply and discharge of current; each individual switching stage is switched in and out positively because the switching members alternating with each other are placed upon the contact points with predetermined pressure and on precisely prescribed paths and are lifted off from the contact points again with equally positive precision. This reliable contact making and breaking ensures a completely satisfactory supply and discharge of current for each separate contact point of the entire contact path, whereas it often happens for instance with stageless regulation having permanent contact e. g. sliding current collector of the hitherto known processes and devices that the contact pressure varies considerably in the course of the regulating, so that more or less high transition losses may occur.

In contrast to this, the process according to the invention offers the great advantage that very high specific contact pressures are employed. It permits in particular, when the switching members consist of very efficient conducting materials, the withdrawal or supply of currents of 200 amps. or more. The potentials between the individual turns of the regulating winding can also amount to many times the potentials of the turns permissible when carbon rollers are used as the current collector. These advantages of the process according to the invention are in turn based on the fact that each switching member, after it has relieved the other, is raised, with, as it were, a jerking movement from the contact point hitherto touched by it. In given cases, preferably with metal switching members, it is to be recommended to connect the latter with each other by way of a resistance capable of being heavily loaded, in order to render ineffective the circulating currents occurring on the simultaneous touching of two switching members.

The process and the device according to the invention have further the advantage that the winding space is more favourably utilised, so that, for instance, the regulating winding may consist of a single, bare, conductor placed on edge. It is, however, also possible to use instead of a bare conductor an insulated conductor from which the covering has been removed in suitable places.

It is further found that the advantages obtainable on using the process according to the invention are increased if springs are used in known manner in order to introduce or carry out certain operations in an accelerated manner, e. g. the movement of the switching member, or to hold positively for a certain space of time some of the working parts, so that on release a more definite action results. It is particularly recommended to employ a power accumulator in such a manner that, while one switching piece rests upon its contact point, the power accumulator, e. g. a clockwork-type spiral spring, is charged against a locking mechanism, whereupon, after unlocking by release of the spring force, the switching operation is suddenly introduced and carried out in such a manner that the lifted switching member is moved on by the amount of the switching step and lowered onto the next contact point, and directly after the seating of this switching piece has taken place, the other switching piece is lifted and carried after it.

According to the invention, the switching step movements and the raising and lowering movements of the switching members each have their own driving mechanism, which operates separately and is actuated or controlled by a central driving shaft.

For pressing the switching pieces onto the contact points it is also an advantage to accommodate in the holding means a power accumulator which is charged positively, preferably by the switching piece itself, while the latter is travelling over the path from one contact point to the other.

For releasing the power accumulator actuating the central driving shaft switching step by switching step, it is possible to use for instance chain or worm drives guided into the holding means from the outside. When worm drives are used, it is readily possible to use the driving means as used for the feed in sliding and screw cutting lathes. When less sensitive chain drives are used, chains after the style of bicycle chains are recommended. It is, however, also possible to equip the holding means with an electric motor or with electro-magnets which act either directly or indirectly on the driving means for the advance of the holding means and for actuating the switching pieces. If the holding means is guided on rails, friction wheels or the like, which are driven by the electric motor or by electric magnets which actuate for instance cams, these cams act on the guide rails in order thereby to cause the advance. In addition to or instead of mechanical or electrical driving or control means it is, however, also possible to employ hydraulic driving means.

For carrying out the process of stepped forward switching according to the invention, various devices are possible.

A contact arrangement according to the present invention which is to be used with at least two sets of alternately arranged contact faces which are spaced from each other in at least one direction, comprises, in combination, supporting means; at least two contact members movably mounted on the supporting means, each contact member being associated with one of the two sets of contact faces, the contact members being movable in the one direction, each contact member being also movable in a transverse direction between a retracted position, and an advanced contact position for engaging a contact face of the associated set of contact faces; advancing and retracting means movably mounted on the supporting means and connected to the contact members for independently advancing and holding each contact member in the advanced contact position in contact with a contact face of the associated set of contact faces and for independently retracting each of the contact members; shifting means mounted on the supporting means connected to the contact members and alternately moving each of the contact members in the retracted position in the one direction from one contact face to the next contact face of the associated set of contact faces, and simultaneously holding the other of the contact members temporarily immovable in the advanced contact position engaging a contact face located between the one contact face and the next contact face and means movably mounted on the supporting means and connecting the advancing and retracting means and the shifting means for operation in a predetermined sequence.

The advancing and retracting as well as the shifting of the contact members from one contact face to the next engaged contact face may be carried out by hydraulic means.

A preferred form of construction according to the invention for carrying out the process is obtained by using an eccentric control for the movement of the switching members, which eccentric control is preferably provided with a straight guide. The eccentric control may be driven by the central driving shaft which controls the advance of the holding means for the switching members and which is positively externally controlled by way of a chain drive, worm drive or the like. On the two front faces of the disc-shaped driving shaft, eccentric pins, which may be adjustably disposed, are provided for the step-wise moving of the switching members along the contact path. On the eccentric pins increasing the eccentric action, further cams, eccentrics or the like are provided, in order to raise the switching pieces as quickly as possible from the contact path. These two eccentrics connected with each other make possible in a particularly simple and effective manner both the advance movement and the placing on and lifting off of the switching members. By altering the eccentricity, as e. g. by adjusting the eccentric pins, discs etc., or by changing the eccentric shaped bodies themselves, it is readily possible to vary the extent of the various movements and also wholly or partially the nature of the movement. By using straight guides it is possible in addition to obtain particularly efficient controllable advancement and lifting and lowering movements of the switching members.

The eccentric control, together with the straight guides, may be used together with a cylindrical helical spring, which acts on that end of the switching member which does not co-operate with the contact path; whilst the eccentric pin causing the contact stepped movement of the switching member is so disposed that, without lowering or raising it, but sliding along in the switching piece, e. g. in a longitudinal slit thereof, it pushes the switching member forward in the direction of the contact path, so that, as long as it is not raised from its eccentric, it remains on the contact path. Any unevennesses present on the contact path are taken up by the helical spring and so have no effect on the driving and control mechanism. When the longitudinal slit in the switching member is used, the advancing eccentric pin disposed on the central driving shaft preferably passes through this slit; the free end which passes through and points outwards carries the second eccentric. This eccentric preferably acts on a bolt, which is detachably fitted to the switching piece and which is preferably at the same time arranged for the securing of the current supply and discharge cable, and in so doing jerks the switching piece off the contact point, owing to the double eccentricity. Two guiding means, preferably rails, are provided at different distances from the contact path and in a plane vertical to this path, which guiding means may also be utilised for the supply and discharge of current. It has further proved advantageous to dispose the rails symmetrically on both sides of the driving means which cause the advance, which means is rotatably mounted in or parallel to the plane of the guide rails.

A form of construction of the casing for the switching numbers and their actuating means, which is especially suitable is achieved if a casing is used which is preferably divided in the common plane of the guide rails and in the central part of which the driving shaft carrying for instance the chain wheel is disposed. On both sides of the shaft bearing bodies are provided which receive the switching pieces, their power accumulators, and their eccentrics, and which are mounted on the central part of the casing, preferably so as to be displaceable in the direction of the contact path in the manner of a straight guide known on cross heads.

The invention will be further described by way of example with reference to the accompanying diagrammatical drawings in which:

Fig. 2 shows a section vertical to the guide rails across the holding means of the switching pieces and their actuating means.

Fig. 3 shows a longitudinal section along the plane A—B in Fig. 2.

Fig. 4 shows a further longitudinal section along the plane C—D in Fig. 2.

The same parts in the various figures and individual representations are denoted by identical reference numbers.

Figure 1:
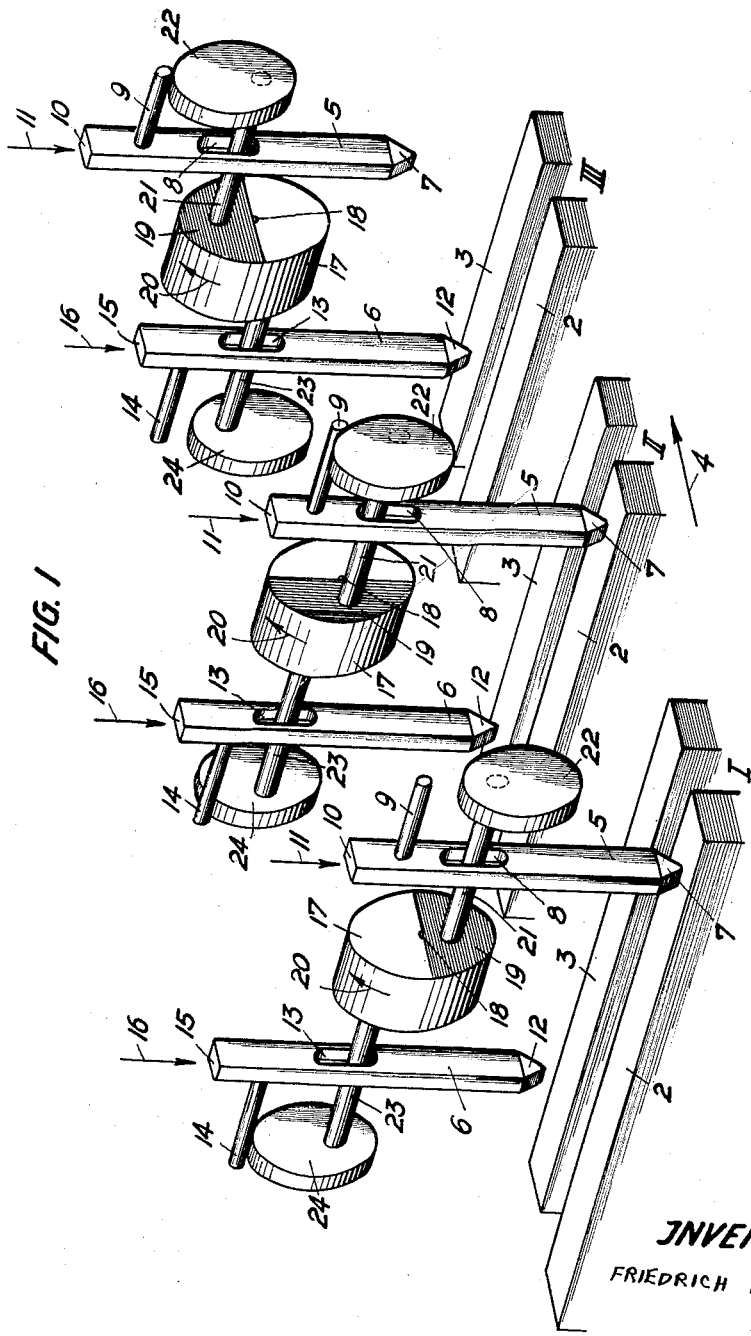
Fig. 1 shows in perspective view three different operating positions of the device provided with eccentric control according to the invention.

The example of construction, shown in the drawings, of a device according to the invention, capable of use in many ways and being simple and robust, will be described firstly in detail, by means of the diagrammatic representation of Fig. 1, in order to make clear the method of operation of the switching and driving mechanism during various operating positions I, II and III. The sequence of the three operating positions illustrated is in the direction of the arrow 4 in the drawings, i. e. from left to right.

The contact surface 1, which is shown in Figs. 2 and 3 for the sake of clarity, only by a line, is represented in Fig. 1 by two sections 2 and 3, forming contact points, on the regulating winding. Two switching members 5 and 6 are guided alternately onto the contact points 2 and 3 and bear on them for a very short time. The switching member 5 is fitted at its contact-making end with a shaped end 7 and has a slot 8 located in its upper section. Between this slot 8 and the end remote from the contact edge, an outwardly projecting bolt 9 is secured to the switching member 5. A cylindrical helical pressure spring (not shown) acts on the top face 10 of the switching member 5 in the line of action indicated by arrow 11.

On the other switching member 6, the sharp contact end is denoted by 12, whilst the slot, the outwardly projecting bolt and the top face are designated 13, 14 or 15 respectively. The line of action of the pressure spring or the like (not shown) is numbered 16.

A disc-shaped driving shaft 17 is disposed between the two switching members 5 and 6; its mounting is not shown for the sake of general clarity. This shaft 17 may carry for instance a chain wheel driven by a chain, roughly in the manner of a bicycle. The axis of rotation 18 of the driving shaft 17 is parallel to the contact path 1, 2, 3. The face of driving shaft 17 facing the observer is half shaded 19 black and half white, thus clarifying the position of 17 during the various operating positions. Arrow 20 indicates the direction of rotation of the driving shaft 17.

On the forwardly facing front of the driving shaft 17 an eccentric or crank pin 21 is provided which pin passes through the slot 8 on the switching member 5 and on its free end carries a circular disc 22, which is likewise eccentrically disposed in such a manner, that with the crank pin 21 a double eccentric 21, 22 is formed.

From the face of the driving shaft 17 remote from the observer, a crank pin 23 projects through the slot 13 in the switching member 6, and carries on its free end eccentrically disposed disc 24.

The discs 22 and 24 co-operate with bolts 9 and 14 respectively fixedly disposed on the switching members 5 and 6.

The disc 22, acting as a double eccentric, is lifted and turned when rotation of the driving shaft 17 takes place in the direction of the arrow 20. When the position of the driving shaft 17 indicated in the operating position II has been reached, the double eccentric disc 22 has been swung round so far that it touches the bolt 9. On the other side, the disc 24 is just beginning to leave the bolt 14 of the switching member 6.

On further rotation of the driving shaft 17, the disc 22 lifts the bolt 9, which is now bearing on it, together with the contact 7, very quickly or positively off the contact point 2, against the action of the spring acting on surface 10. The slots 8 and 13 have the purpose of keeping the switching members 5 and 6 in contact with the path 1, 2, 3 independently of the advancing movement of the step and switching mechanism, as shown in detail by the illustration I, II, in Fig. 1.

The described form of construction of the device according to the invention operates substantially as follows:

In position I of Fig. 1, under the action 11 of a spring the switching member 5 is held firmly in contact with the section 2 of the regulating winding, which section is constructed as a contact surface. The actuating disc 22 is remote from the bolt 9. On the other side of the driving shaft 17, the eccentric disc 24, however, holds the switching member 6 away from the contact surface 3 of the regulating winding by pressure on the bolt 14 against the direction of action of the spring or the like (not shown).

In the further course of operation of the device, the driving shaft 17 is rotated through about 90° in the direction of the arrow 20. The operating position is now as shown in position II of Fig. 1. The crank pin 21 has travelled upwards in the slot 8 of the switching member 5, without, however having raised the said member from the contact point while so doing; this is prevented by the pressure spring. The crank pin 23, because of its eccentricity in relation to the crank pin 21, has moved the switching member 6 above the contact point. The flow of current continues through member 5 as the pressure of the spring on this member keeps it in contact with surface 2. In the meantime, the switching member 6 has moved downwards in the direction of the arrow 16, onto the contact point 3 under the action of its own spring, because the eccentric disc 24 has separated from the bolt 14 by rotation through 90° of the disc 24. The bolt 14 thus released moved downwards together with the member 6, the eccentric pin 23 sliding in the slot 13 in the member and in this way allowing the downward movement.

In the working position III, the driving shaft 17 is again shown rotated through a further 90° in the direction of the arrow 20. On its rotation into the operating position shown, the doubly eccentrically mounted control disc 22 has raised the bolt 9 with the switching member 5 very quickly with a jerk as it were, against the spring force 11 from the contact surface 2 which it had hitherto touched. At the same time, the crank pin 21 has moved the switching member 5 further by one switching step in the direction of the contact path, which step results from the rotation of the crank pin through 90° out of the operating position II into the operating position III. In the meantime, the eccentric disc 24 has been as far separated from the bolt 14 of the switching piece 6 as the eccentric disc 22 and the bolt 9 are separated in the operating position I.

The cycle of work of the switching and driving mechanisms continues as described; after two further switching steps each with 90° rotation of the driving shaft, the starting point shown in diagram I would be reached again, only the contact points are then correspondingly different.

Figs. 2–4 illlustrate the development of the example of construction shown of the device according to the invention.

In Fig. 2, 25 and 26 are the two halves of the casing of a switching mechanism between which there is a joint 27. The mechanism is supported on rails 34 and 41. The joint 27 is provided because rails, on which the casing is guided and suspended, pass through the casing longitudinally. The joint makes possible a solid fit of the casing parts on the rail surfaces and obviates any play. The two casing parts 25, 26 support each other not directly, but by way of the rail, they can be held together in known manner, e. g. by means of bolts.

In the top section of the half casing 25 a recess 28 is provided, said recess extending along the upper of the two aforementioned rails. Opposite the lengthwise surface of the rail there is in the base of the recess 28 a strip 29 consisting for instance of copper. Between this strip and the rail a corrugated spring band 30 is disposed, which serves for transmitting current when the supporting and guiding rail is at the same time used as an electrical conductor. In this case, the current is led into and away from the switching piece by way of a cable 79.

The corresponding recess, strip and spring provided in the casing half 26 are numbered 31, 32 and 33 respectively. The parts described above are also duplicated in the lower section of the casing halves 25 and 26. In the half 25, the recess, the conductor and the spring strip are numbered 35, 36 and 37 respectively; correspondingly in the casing part 26 they are numbered 38, 39 and 40. The lower supporting and guiding rail is numbered 41 (see also Figs. 3 and 4).

Figure 5:
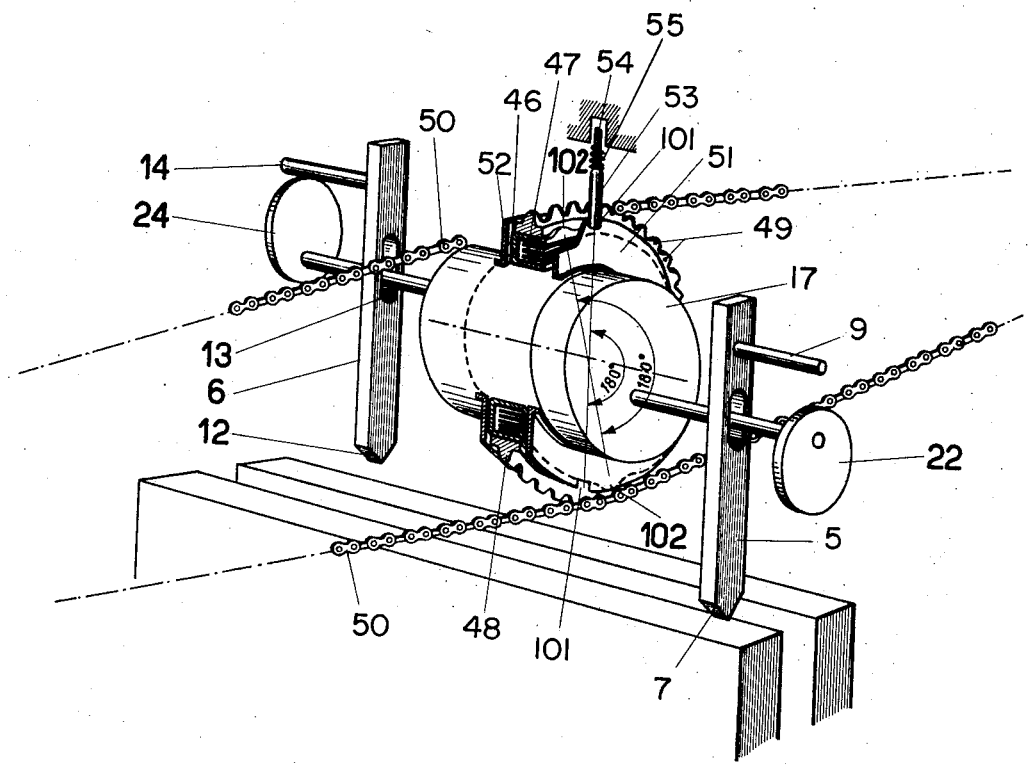
Fig. 5 is a perspective view of an arrangement according to the present invention.

Inside the casing 25, 26 and about the central transverse axis two fairly large symmetrical recesses 42 and 43 are provided. These recesses receive the driving mechanism. In the example of construction shown, a driving shaft 17 with chain wheel 49 and lengthwise passing chain 50 is shown. The driving shaft 17 is supported within the casing parts 25 or 26 by way of axial ball bearings 44 and 45. Between the rings of the ball bearings, a ring 46 slides in the driving shaft 17; this ring is of U-shaped cross-section and is disposed with the opening at the side. Between the shanks of this ring there is a power storing means consisting substantially of a spiral spring 47. The U-shaped ring 46 is embraced externally by the hub 48 of the chain wheel, which is firmly fitted on the ring. A chain 50 engaging in the teeth can be seen in the section of Fig. 2, and in Fig. 5 but is omitted in Figs. 3 and 4.

Between the U-shaped ring body 46, which is mounted so as to be loosely rotatable on the driving shaft 17, and the two ball bearings 44 and 45, are situated angular rings 51 or 52. The ring 51 has two recesses 101 which are staggered by 180° to each other, and in one of which, in the operating position shown, the bolt 53 engages, which has at its end remote from engagement a tapered projection 54, which is surrounded by a cylindrical helical spring 55 which acts as an expanding pressure spring and rests between the shoulder of the bolt 53 and the base of a recess 57 in the casing half 25, or abuts against these two parts. The projection of smaller diameter 54 engages in a guide bore 56 in the casing half 25.

The spiral spring 47 accommodated in the U-shaped ring 46 is secured, at the top side of the ring 46, to the ring 51 by its end adjacent to the driving shaft 17, while the other end is firmly fixed to that side of the U-shaped casing ring 46 which faces the chain wheel 49. Two cams 102 offset by 180° for actuating the spring-loaded bolt 53 are disposed on this ring 46.

On the rotation of the chain wheel 49, for effecting the switching process, the spiral spring 47 is tensioned, as the ring 51 remains stationary. After rotation of the chain wheel and of the casing 46 firmly coupled with it through about 180°, one of the two cams 102 raises the bolt 53, which locks the ring 51, against the action of the spring 55. By this means the ring 51 fixedly disposed on the spindle 17 is released, so that the accumulated force of the spiral spring 47 turns the shaft 17 further with a sudden movement, until the second recess in the ring 51, which is offset by 180°, is locked by the bolt 53, whereupon the cycle of work is repeated again.

The device described for the quickened, somewhat jerky movement of the driving shaft 17 actuating the switching members has the particular advantage that the switching members 5 and 6 always only touch the contact points simultaneously for a very short time.

On both sides of the driving shaft 17 are disposed the eccentrics for moving the switching members 5 and 6; they are accommodated in longitudinal bodies 58 and 72, which in turn are mounted on the casing 25, 26 so as to be displaceable in the longitudinal direction of the rails 34, 41. For this purpose, the middle parts of the casing form lateral limbs which at the top and at the bottom engage over or under the bearing pedestals for the switching member and the eccentric, between which limbs the plate-shaped guide bodies are slidingly movable. This mobility of the bearing pedestals makes possible the stepwise switching onwards of the two switching members, caused by the eccentrics. The contact pressure required and the raising of the switching members is accomplished by means of further eccentrics, as already illustrated with reference to the diagrammatically represented Fig. 1.

In Fig. 2, the left-hand sliding bearing body is numbered 58. It is slidingly supported on the limb 59 of the casing part 25. For ensuring sliding with as little friction as possible and a good fit, the body 58 is so set back on the sliding bearing surface that it is only supported by the comparatively narrow ledge 60. The top limb of the middle part of the casing 25 is numbered 61. The top surface of the bearing body 58 over which 61 passes is provided along the sliding track on the lower side of the limb 58 with a groove 62, through which, corresponding to the ledge 60, two sliding ledges not defined in more detail are formed for guiding the bearing body 58 along the limb 61.

The bearing body 58 has recesses for the various eccentrics or their furthest extending working orbits and for the switching piece 5 and the spring. The circular recess 63 (Fig. 3) gives space for the eccentric 22 controlling the lift movements of the member 5. This eccentric is firmly fitted to a further eccentric pin or crank pin 21, by means of which the member 5 is switched forward along the contact path, and which pin runs up and down in the slot 8 in the member 5. The pin 21 is firmly seated on the driving shaft 17. In the top part of member 5 the contact bolt 9 is secured, e. g., screwed in, to which bolt the current supply and discharge cable 71 is fitted. The bolt 9, which projects for some distance out of the switching member, serves further for the action of the eccentric disc 22, by means of which the bolt and thus the switching member is raised rapidly, with a jerk, as it were, from the contact path.

The circular space 63 in the bearing body 58 continues upwardly into a roughly cylindrical recess 64 in which the cylindrical helical spring 65 is partly accommodated and abuts against the base of the recess. Opposite the recess 64 there is situated in the bearing body 58, a recess 66, which serves as the mounting of the bolt-shaped switching member 5 which passes through it. The tightly enclosing recess 66 is followed in a direction towards the contact path by the slot-shaped recess 67 in the limb 59 of the casing part 25. The slot 67 makes possible the movement of the switching member 5, which is caused by the eccentric, in the direction of the contact path on change of contact. The bearing body 58 and the limbs 59 and 61 of the casing part 25 engaging above and below it are covered externally by a plate 68 which is detachably secured to the said limbs with the aid of bolts (not illustrated) whose centre line has the reference number 69. The covering plate 68 is provided roughly opposite the spring with a recess 70, through which the current supply cable 71 connected to the cable bolt 9 passes, which cable is guided to a resilient contact ledge 37.

The bearing body 72 described in the following, and the appropriate parts are, for the sake of symmetry and uniformity relative to the bearing body first described, provided with reference numbers only in isolated cases. The recess in the bearing body 72 receiving the cylindrical helical spring 73 is numbered 74. The eccentric disc 24 moves in the circular recess 75 in the bearing body and is firmly fitted to the crank pin 23 which is seated in the driving shaft 17 in staggered relationship to the crank pin 21 (cf. Fig. 2). The bearing body 75 and the limbs of the casing part 26 engaging above and below it are covered externally by a plate 76 through the slot 77 in which the cable 79 is carried (cf. also Fig. 4) which is connected to the contact bolt 14, which is preferably detachably secured, e. g. screwed in, to the top end of the switching member 6. The crank pin 23 passes through the slot 13 in the contact member. The cable 79 is secured in a manner (not shown) at the point 80 to resilient contact strips 37 (cf. Figs. 4 and 1). Like the plate 69, the plate 76 is detachably secured to the limb of the casing part 26 by means of screws, one of which is indicated by its centre line 78.

The method of operation of the device for actuating the switching members according to Figs. 2–4 corresponds to the method of operation as has been described in detail with reference to Fig. 1. The casing parts 25 and 26 are attached to and run along the rails 34, 41. The drive required for this purpose is effected by way of the chain 50 (shown only in section), and the chain wheel 48, 49. The shaft 17, which is rotated with a jerking motion is described above, sets the crank pins 21, 23 and the double-eccentrically fitted discs 22, 24 into revolution, whereby the switching member 6 is switched further in the longitudinal direction of the contact path and, with certain switching positions, is at the same time lowered onto the predetermined contact point by means of the second eccentric 24, through the action of the spring 73. The advance and the lifting and lowering movements of the switching member 5 having a contact edge 7 are performed, according to the invention, in counter-time.

I claim:
1. In a device of the character described in combination, two sets of first contact members, each first contact member having a contact portion, said first contact members being arranged so that the contact portions within each set of first contact members are arranged spaced from each other and the contact portions of one set of first contact members are arranged along a path being parallel to the path along which the contact portions of the other set of first contact members are arranged; a contact arrangement including supporting means; means for moving said supporting means in the direction of and along said paths; two second contact members mounted on said supporting means movable toward and away from said contact portions of said sets of first contact members, respectively; means movably mounted on said supporting means for moving one of said second contact members within spaced time intervals between the contact faces of consecutive first contact members of one of said sets of first contact members by retracting said one second contact member from one contact face, moving it toward the next contact face and advancing it onto the same; and means movably mounted on said supporting means for moving the other of said second contact members in the time intervals between said spaced time intervals when said one second contact member moves between the contact faces of consecutive first contact members of the other of said sets of first contact members by retracting said other second contact members from one contact face, moving it toward the next contact face and advancing onto the same.

2. For use with an apparatus having at least two sets of alternately arranged contact faces which are spaced from each other in at least one direction, a contact arrangement, comprising, in combination, supporting means; at least two contact members movably mounted on said supporting means, each contact member being associated with one of said two sets of contact faces, said contact members being movable in said one direction, each contact member being also movable in a transverse direction between a retracted position, and an advanced contact position for engaging a contact face of the associated set of contact faces; advancing and retracting means movably mounted on said supporting means and connected to said contact members for independently advancing and holding each contact member in said advanced contact position in contact with a contact face of the associated set of contact faces and for independently retracting each of said contact members; shifting means mounted on said supporting means connected to said contact members and alternately moving each of said contact members in said retracted position in said one direction from one contact face to the next contact face of the associated set of contact faces, and simultaneously holding the other of said contact members temporarily immovable in said advanced contact position engaging a contact face located between said one contact face and said next contact face and means movably mounted on said supporting means and connecting said advancing and retracting means and said shifting means for operation in a predetermined sequence.

3. For use with an apparatus having at least two sets of alternately arranged contact faces which are spaced from each other in at least one direction, a contact arrangement, comprising, in combination, supporting means movable at least in one direction; means for moving said supporting means in said one direction; at least two contact members movably mounted on said supporting means, each contact member being associated with one of said two sets of contact faces, said contact members being movable in said supporting means in said one direction and in a direction opposite thereto, each contact member being also movable in a transverse direction between a retracted position, and an advanced contact position for engaging a contact face of the associated set of contact faces; means for independently advancing and holding each contact member in said advanced contact position in contact with a contact face of the associated set of contact faces; means for independently retracting each of said contact members; a rotary member rotatably mounted in said supporting means; means for rotating said rotary member; and eccentric means secured to said rotary member spaced from the axis of rotation of the same and being connected to said two contact members for alternately moving each of said contact members in said retracted position in said one direction from one contact face to the next contact face of the associated set of contact faces during movement of said movable supporting means in said one direction, and for simultaneously moving the other of said contact members in said supporting means in said opposite direction so that said other of said contact members remains temporarily immovable in said advanced contact position engaging a contact face located between said one contact face and said next contact face.

4. For use with an apparatus having at least two sets of alternately arranged contact faces which are spaced from each other in at least one direction; a contact arrangement, comprising, in combination, supporting means movable at least in one direction; means for moving said supporting means in said one direction; at least two contact members movably mounted on said supporting means, each contact member being associated with one of said two sets of contact faces, said contact members being movable in said supporting means in said one direction and in a direction opposite thereto, each contact member being also movable in a transverse direction between a retracted position, and an advanced contact position for engaging a contact face of the associated set of contact faces, each contact member being formed with an elongated slot extending in said transverse direction; resilient means for independently advancing and holding each contact member in said advanced contact position in contact with a contact face of the associated set of contact faces; means for independently retracting each of said contact members; a rotary member rotatably mounted in said supporting means intermediate said contact members and having an axis extending normal to said one direction and to said transverse direction; means for rotating said rotary member; and two diametrically arranged actuating pins secured to said rotary member spaced from the axis thereof and projecting parallel to said axis in opposite directions into said elongated slots of said contact members; said actuating pins constituting means for alternately moving each of said contact members in said retracted position in said one direction from one contact face to the next contact face of the associated set of contact faces during movement of said movable supporting means in said one direction, and for simultaneously moving the other of said contact members in said supporting means in said opposite direction so that said other of said contact members remains temporarily immovable in said advanced contact position engaging a contact face located between said one contact face and said next contact face.

5. For use with an apparatus having at least two sets of alternately arranged contact faces which are spaced from each other in at least one direction, a contact arrangement, comprising, in combination, supporting means movable at least in one direction; means for moving said supporting means in said one direction; at least two contact members movably mounted on said supporting means, each contact member being associated with one of said two sets of contact faces, said contact members being movable in said supporting means in said one direction and in a direction opposite thereto, each contact member being also movable in a transverse direction between a retracted position, and an advanced contact position for engaging a contact face of the associated set of contact faces, each contact member being formed with an elongated slot extending in said transverse direction; resilient means for independently advancing and holding each contact member in said advanced contact position in contact with a contact face of the associated set of contact faces; a rotary member rotatably mounted in said supporting means intermediate said contact members and having an axis extending normal to said one direction and to said transverse direction; means for rotating said rotary member; two diametrically arranged actuating pins secured to said rotary member spaced from the axis thereof and projecting parallel to said axis in opposite directions into said elongated slots of said contact members; said actuating pins constituting means for alternately moving each of said contact members in said retracted position in said one direction from one contact face to the next contact face of the associated set of contact faces during movement of said movable supporting means in said one direction, and for simultaneously moving the other of said contact members in said supporting means in said opposite direction so that said other of said contact members remains temporarily immovable in said advanced contact position engaging a contact face located between said one contact face and said next contact face; at least two cam members secured to said actuating pins; and at least two projecting members each secured to one of said contact members and being alternately engaged by one of said cam members during rotation of said rotary member, said cam members and said projecting members constituting means for independently retracting each of said contact members.

6. For use with an apparatus having at least two sets of alternately arranged contact faces which are spaced from each other in at least one direction, a contact arrangement, comprising, in combination, supporting means movable at least in one direction; means for moving said supporting means in said one direction; at least two support members mounted in said supporting means movable in said one direction and in an opposite direction independently of each other; two contact members, each contact member mounted in one of said support members for movement therewith in said one direction and in said opposite direction, each contact member being associated with one of said two sets of contact faces, each contact member being also movable in a transverse direction in the associated support member between a retracted position, and an advanced contact position for engaging a contact face of the associated set of contact faces, each contact member being formed with an elongated slot extending in said transverse direction; resilient means mounted in each of said support members for independently advancing and holding each contact member in said advanced contact position in contact with a contact face of the associated set of contact faces; a rotary member rotatably mounted in said supporting means intermediate said contact members and having an axis extending normal to said one direction and to said transverse direction; means for rotating said rotary member; two diametrically arranged actuating pins secured to said rotary member spaced from the axis thereof and projecting parallel to said axis in opposite directions into said elongated slots of said contact members; said actuating pins constituting means for alternately moving each of said contact members in said retracted position in said one direction from one contact face to the next contact face of the associated set of contact faces during movement of said movable supporting means in said one direction, and for simultaneously moving the other of said contact members in said supporting means in said opposite direction so that said other of said contact members remains temporarily immovable in said advanced contact position engaging a contact face located between said one contact face and said next contact face; at least two cam members secured to said actuating pins; and at least two projecting members each secured to one of said contact members and being alternately engaged by one of said cam members during rotation of said rotary member, said cam members and said projecting members constituting means for independently retracting each of said contact members.

7. An arrangement as claimed in claim 4 wherein said means for rotating said rotary member include first means movably mounted on said rotary member; second means fixedly secured to said rotary member and located adjacent said first means; spring means connecting said first and second means; arresting means for arresting said second means and thereby said rotary member; means for rotating said first means whereby said spring is tensioned; and releasing means for releasing said arresting means and connected to said rotary member for rotation and for releasing said arresting means in predetermined relative positions of said first means and said rotary member so that the recoil action of the released tensioned spring means effects a rapid actuation of said contact members.

8. An arrangement as claimed in claim 7, and including supporting rails passing through said movable supporting means and supporting the same for movement in said one direction.

No references cited.